United States Patent
Ellison

(10) Patent No.: US 6,284,835 B1
(45) Date of Patent: Sep. 4, 2001

(54) HIGH IMPACT COATINGS

(75) Inventor: Matthew Ellison, Carmel, IN (US)

(73) Assignee: Lilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/350,752

(22) Filed: Jul. 9, 1999

(51) Int. Cl.$^7$ ............... C08J 3/00; C08K 3/20; C08L 75/00; C08F 2/46; C08G 18/00
(52) U.S. Cl. ............... 524/590; 427/372.2; 427/385.5; 473/351; 473/365; 473/378; 522/90; 522/96; 522/181; 522/186; 524/589; 525/123; 525/455
(58) Field of Search ................... 524/589, 590; 525/123, 455; 522/90, 96, 181, 186; 427/385.5, 372.2; 473/351, 365, 378

(56) References Cited

U.S. PATENT DOCUMENTS

| | | | |
|---|---|---|---|
| 4,065,587 | 12/1977 | Ting | 427/54 |
| 4,230,550 | 10/1980 | Vincent | 204/159.23 |
| 4,600,649 | 7/1986 | Leo | 428/412 |
| 4,679,794 | 7/1987 | Yamada et al. | 273/235 R |
| 4,679,795 | 7/1987 | Melvin et al. | 273/235 R |
| 4,740,577 | 4/1988 | DeVoe et al. | 528/51 |
| 4,798,386 | 1/1989 | Berard | 273/236 R |
| 4,802,674 | 2/1989 | Kitaoh | 273/235 A |
| 4,865,326 | 9/1989 | Isaac et al. | 273/235 A |
| 4,900,763 | 2/1990 | Kraushaar | 522/14 |
| 4,902,725 | 2/1990 | Moore | 522/42 |
| 5,000,458 | 3/1991 | Proudfit | 273/235 A |
| 5,018,742 | 5/1991 | Isaac et al. | 273/235 A |
| 5,456,954 | 10/1995 | Sullivan | 427/553 |
| 5,459,220 | 10/1995 | Kennedy | 528/44 |
| 5,461,109 | 10/1995 | Blair et al. | 524/839 |
| 5,502,100 | 3/1996 | Maruoka et al. | 524/430 |
| 5,506,004 | 4/1996 | Maruoka et al. | 427/425 |
| 5,506,292 | 4/1996 | Horiuchi et al. | 524/430 |
| 5,542,680 | 8/1996 | Proudfit et al. | 473/378 |
| 5,696,414 | 12/1997 | Yokota | 473/384 |
| 6,110,988 | * 8/2000 | Lake | 522/75 |

OTHER PUBLICATIONS

"Green Technology—UV puts a new spin on golf balls," Triplett, T., *Industrial Paint & Powder*, 6/96, 14–18.

"Sutherland chases dream to build 'perfect' ball," Whitford, M., *Rubber & Plastics News*, Oct. 20, 1997, 22–23.

* cited by examiner

*Primary Examiner*—Patrick D. Niland
(74) *Attorney, Agent, or Firm*—Barnes & Thornburg

(57) ABSTRACT

Curable coating compositions exhibiting exceptional resistance to high impact damage are described. The composition is formulated using a combination of poly and monofunctional ethylenically unsaturated monomers, oligomers and polymers. The composition can be applied using standard coating application techniques and cured rapidly under initiator dependent curing conditions. The compositions can be formulated to include optical brighteners, pigments, flow agents to enhance coating functionality in selected applications.

30 Claims, No Drawings

HIGH IMPACT COATINGS

FIELD OF INVENTION

This invention relates to curable coating compositions exhibiting exceptional resistance to high impact damage. More particularly, this invention is directed to a coating composition formulated with a unique combination of polyfunctional and monofunctional ethylenically unsaturated monomers, oligomers and polymers that can be easily applied and rapidly cured to form coatings exhibiting exceptional resistance to damage in high impact use applications.

BACKGROUND AND SUMMARY OF THE INVENTION

There has been much effort in the coatings industry to develop application specific coatings, ie., coatings that exhibit chemical and physical properties necessary for dependable coating performance under selected usage conditions. The property of impact resistance in a coating composition requires a dynamic balance between hardness and flexibility that allows the coating to endure points of impact, typically of a force sufficient to deform not only the coating but as well the underlying surface, without the coating breaking, chipping or cracking, or losing adhesion to the underlying surface. Exemplary of applications requiring impact tolerance is in coatings used in certain sporting equipment, for example, on golf balls and bowling pins, as well as coatings targeted for application to vehicle bumpers and other surfaces subjected to impact deformation in normal use.

The present invention provides a coating formulation capable of providing impact resistant/tolerant coatings exhibiting good adhesion and resistance to being marred, chipped, cracked or deformed at points of high impact. In one embodiment of this invention the coating compositions are formulated for application as a clear top coat for golf balls. Such coating compositions in accordance with this invention include combinations of mono- and polyethylenically unsaturated resin solids, an effective amount of a radical or cationic polymerization initiator to polymerize the resin composition and an effective amount of an optical brightener. Optionally the coating composition in accordance with this invention can be pigmented.

The coating compositions in accordance with this invention are adapted for application by any of the art-recognized coating application techniques, including spray application to provide coated surfaces with high impact tolerance. The present coating compositions can be formulated as solvent-free compositions using reactive diluents to provide viscosity control or they can comprise a solvent, typically a mixture of ketone and ester solvents commonly used for solvent-based coatings, and about 30% to about 100% by weight of ethylenically unsaturated resin solids. Preferred ethylenic unsaturated groups are acrylate, methacrylate and vinyl ethers. The radical initiated resin solids are selected to include a mixture of both monoethylenically unsaturated monomers and polyethylenically unsaturated monomers, most typically a multiplicity of polyethylenically unsaturated resins, each selected for its contribution to the aggregate properties of the polymerized coating product. The cationic initiated resin solids can include polyols, vinyl ethers and cycloaliphatic epoxies. In one preferred embodiment, the components are also selected for their optical purity and non-yellowing characteristics, particularly for use in non-pigmented compositions.

A polymerization initiator is included in the composition in an amount effective to polymerize the resin composition. The initiator can be a cationic polymerization initiator or a radical initiator depending on the resin reactants and is typically activated by actinic radiation, for example, UV radiation. Alternatively, for some applications, the initiator can be a compound that initiates polymerization at ambient or elevated temperatures. Again, such components are selected so that they will have minimum impact on coating clarity and so that they will not engender or augment radiation-induced yellowing of the polymerized coating composition. In addition, coating compositions of this invention formulated, for example, as a top coat for golf balls can include any one of a wide variety of art-recognized optical brighteners.

The cured coatings prepared using the preferred coating compositions of the present invention exhibit superior high impact and abrasion resistance, excellent adhesion, and good color retention upon prolonged exposure to UV radiation.

DETAILED DESCRIPTION OF THE INVENTION

In accordance with this invention there is provided a coating composition for producing high impact tolerant surfaces. The coating composition is about 30% to about 100% by weight of ethylenically unsaturated resin solids. Typically the resin solids comprise about 10% to about 40% by weight of monoethylenically unsaturated monomers and about 60 to about 90% by weight polyethylenically unsaturated resins (monomers, oligomers or polymers), most preferably having acrylate and/or methacrylate functionalities. In one embodiment of the invention the polyethylenically unsaturated resin component includes a urethane (meth)acrylate [acrylate or methacrylate] having a functional equivalent molecular weight of about 500 to about 2500 and having about 2 to about 3 (meth)acrylate functional groups per molecule. The term "functional equivalent molecular weight" as used herein is the average molecular weight of the polyurethane chain divided by the average number of olefinic functional groups per polymer molecule. Preferably the aliphatic urethane (meth)acrylate has a functional equivalent molecular weight of about 600 to about 1800. In one embodiment of the invention the aliphatic urethane (meth)acrylate constitutes about 20% to about 55%, more preferably about 25% to about 45%, by weight of the resin solids. Exemplary of such oligomers are those available from Bomar Specialties, including BR-582E; BR-5824, and BR-5825. Other suitable aliphatic urethane acrylates are commercially available as EBECRYL 8800-20R; EBECRYL 8804; EBECRYL 284; and EBECRYL 8800 from UCB Radcure.

Another polyethylenically unsaturated component of the compositions of one embodiment of this invention is a hexafunctional oligomer, preferably an aliphatic urethane (meth)acrylate, having a functional equivalent molecular weight of about 100 to about 250. The hexafunctional oligomer constitutes about 5% to about 15%, more typically about 7% to about 11% by weight of the resin solids. In one preferred embodiment the polyethylenically unsaturated resin component of the present coating composition also includes about 20% to about 40%, more typically about 25% to about 35% by weight of the resin solids of an alkoxlyated polyol di- or tri(meth)acrylate including, but not limited to, alkoxylated hexanediol diacrylate, alkoxylated cyclohexane dimethanol diacrylate, alkoxylated neopentyl glycol diacrylate, alkoxylated trimethylolpropane triacrylate, alkoxylated glyceryl triacrylate, or their corresponding methacrylates, with propoxylated glyceryl triacrylate being a preferred example.

The polyethylenically unsaturated resin component of the resin solids portion of the present coating composition can be further characterized in terms of the ratios of the various components. In one aspect of the invention the weight ratio of alkoxylated polyol di- or tri(meth)acrylate to the 2-3- functional urethane (meth)acrylate is about 2:1 to about 1:2. In another embodiment the weight ratio of alkoxylated polyol di- or triacrylate to hexafunctional oligomer is about 2:1 to about 4:1. In still another embodiment of the invention the ratio of 2-3-functional resin solids including the alkoxylated polyol di- or tri(meth)acrylate to hexafunctional resin solids is about 2:1 to about 12:1.

The monoethylenically unsaturated monomer components of the resin solids are preferably selected from commercially available monomer (meth)acrylates, including (meth)acrylated carbamate monomers, $C_1$–$C_6$ hydroxy acid (meth)acrylates, and (meth)acrylic acid esters such as isobornyl (meth)acrylate. Other monofunctional ethylenically unsaturated monomers/oligomers may be utilized provided that they do not contribute to unwanted viscosity and/or coloration in the final composition where viscosity and/or coloration is important for coating functionality and appearance. In one embodiment of the invention the monoethylenically unsaturated monomer component of the present coating composition includes a combination of commercially available (meth)acrylated monomers, for example, a (meth)acrylated carbamate monomer, a (meth)acrylated $C_1$–$C_6$ hydroxy acid, and an acrylic acid ester, such as isobornyl (meth)acrylate. The (meth)acrylated carbamate monomer typically comprises about 5% to about 20%, more typically about 5% to about 15%, of the resin solids. The (meth)acrylated hydroxy acid typically forms about 5% to about 10%, more typically about 5% by weight of the resin solids component of the present coating composition. Another monofunctional ethylenically unsaturated monomer component providing use in one embodiment of the present invention is isobornyl (meth)acrylate, typically forming about 5% to about 15% by weight, more preferably about 7% to about 12% by weight of the resin solids component of the present coating composition.

The present coating compositions can also include up to about 70% by weight of the present coating compositions, one or more solvents recognized in the art as useful in solvent-based coatings. The solvent is typically selected from the group consisting of $C_3$–$C_6$ ketones and $C_1$–$C_6$ alkyl acetate, propionate or butyrate and combinations thereof. A combination of methyl ethyl ketone and n-alkyl acetates, for example, n-butyl acetate, forming about 20 to about 55% by weight of the coating composition, has provided coating compositions with excellent spray coating application characteristics.

In another embodiment of this invention there is provided a radiation-curable coating composition comprising ethylenically unsaturated resin solids and about 0 to 70% solvent. The resin solids comprise at least two (meth)acrylated monomers and at least two poly(meth)acrylated urethane resins. One of the poly(meth)acrylated urethane resins has a functional equivalent molecular weight of about 500 to about 2500, and the other, typically a hexafunctional aliphatic urethane (meth)acrylate, has a functional equivalent molecular weight of about 100 to about 250; the poly(meth)acrylated urethane resin components of the composition are combined in formulating the present coating composition in a weight ratio of about 2:1 to about 7:1, respectively. At least one of the monofunctional (meth)acrylate monomers in this embodiment of the invention includes a carboxylic acid functionality; other monofunctional components include acrylated carbamate monomers and alkyl or cycloalkyl (meth)acrylates. Optionally, the composition comprises up to 70 weight percent of solvent selected from the group consisting of $C_3$–$C_6$ ketones and $C_1$–$C_6$ alkyl acetate, propionate or butyrates and combinations thereof. In a preferred composition of this embodiment of the present invention, the polyethylenically unsaturated components of the resin solids further comprise an alkoxylated polyol di-(meth) acrylate or tri(meth)acrylate, most preferable a propoxylated glycerol tri(meth)acrylate, preferably forming about 25 to about 35 weight percent of the resin solids in the coating composition. An initiator is included in the present composition in an amount effective to polymerize the resin composition. Optionally, the composition is also formulated to include an effective amount of an optical brightener.

The present compositions typically include a radiation- or thermally-inducible initiator. Radiation-inducible photoinitiators are preferred and there are a wide variety of such compositions that are commercially available, including alpha ketoesters, such as methyl glyoxylate and alpha-hydroxy ketones such as IRGACURE 184 and DAROCUR 1173. For pigmented compositions in accordance with the present invention it is recognized that certain phosphine oxide related photoinitiators are preferred such as IRGACUTRE 1700. Photoinitiators typically form less than 5% by weight of the components of the present coating compositions. Exemplary of cationic initiators finding use in accordance with such embodiments of the invention include triarylsulfonium hexafluoroantimonate and diphenyliodium hexafluorophosphate.

Other optional additives for use in the present compositions include optical brighteners such as those described in U.S. Pat. Nos. 4,865,326, 4,679,795, and 4,802,674, the teachings of which are expressly incorporated herein by reference. Typically, optical brighteners are effective in the present composition at less than 0.3 percent by weight.

The compositions of the present invention are typically formulated using standard coating formulation techniques; thus, for example, in preparation of a solvent containing composition of this invention, one or more oligomers can be dissolved in the first solvent to form a solution to which is added the other resin components and coating excipients, for example, pigments and/or flow agents as are well known in the art, optionally dissolved in a second solvent. In one embodiment of the present invention the solvent component is a mixture of butylacetate and methylethyl ketone in a ratio of about 8:1 to about 2:1. The amount of other common coating additives/excipients can be determined by routine experimentation based on knowledge in the art. Flow agents are typically used at < 1% by weight solids.

The coating composition is blended to have a viscosity suitable for the targeted mode of application. It can be applied via curtain coating, roll coating, flow coating, dip coating, or by spray coating utilizing either an air, airless or air assisted airless spray gun or a centrifugal spray device such as one of turbo bell or turbo disk construction. Alternatively the present compositions, particularly those formulated without organic solvents, can be applied as a heated spray utilizing any of the above summarized spray techniques. Coatings formed from the present composition typically have a dry thickness of about 0.5 to about 1 mil.

Coating composition viscosities range from about 10 centipoise to about 2000 centipoise, more typically about 15 to about 65 centipoise for solvent reduced spray coating applications. Solvent-free compositions of this invention have typical viscosities of about 200 to about 3500 centipoise, which viscosities can be reduced to facilitate spray application with heating of the composition.

Following application, the coatings are cured in an initiator-dependent process. For example, the coatings can be cured without use of a photoinitiator with electron beam radiation. More typically, however, the present coating compositions include a radiation-inducible initiator and can be typically cured with incident UV/visible radiation from a standard 300 watts in mercury bulb or similar sources of UV radiation. Radiation-induced cure of the present coating compositions can be carried out under nitrogen to minimize influence of atmospheric oxygen quenching.

In one preferred embodiment of the present invention, a coating composition as herein described and claimed is used to provide an optically bright impact resistant coating on golf balls. Golf balls are typically formed to have an outer ionomer cover, e.g., Surlyn®, which is typically first covered with a primer coat and thereafter coated with an optically brightened clear coat composition in accordance with this invention. Golf balls, bowling pins and other high impact articles coated with compositions in accordance with preferred embodiments of this invention exhibit exceptional impact resistance and minimal UV induced discoloration of the finish coatings.

The following tables identity coating compositions prepared in accordance with this invention (Table I), their temperature dependent viscosity (Table IV) and testing of golf balls coated with such compositions for impact resistance and color formation (Tables II and III).

After approximately 75 hits, the coated golf balls began to physically deteriorate in a manner that no further testing was possible. The coatings on the balls listed as achieving >75 hits were still intact, however, immediately prior to ball failure.

Color measurement of the initial formulation solution was made prior to the addition of the photoinitiator using APHA color standards prepared by the method referenced in ASTM D 1209-93. Color measurements of coated products were made using a calibrated SPECTROGARD Spectrophotomer from Byk-Gardner following the method referenced in ASTM E 805-81. The values reported were measured using a D65 illumination source and the CIELAB color scale referenced in ASTM D 2244-89. The Delta b* values reported are the difference between the sample and a common industry standard.

Weather resistance was determined using a QUV from Q-Panel Co. as referenced by ASTM Method D 4587-91 and Practice G 53. The panels were exposed in alternating 4 hour cycles of UV and condensation exposure. The color was

TABLE I

Sample Formulations

| Raw Material | Trade Name | A | B | C | D | E | F |
|---|---|---|---|---|---|---|---|
| Urethane Monoacrylate | Ebecryl CL 1039 | 4.45 | 4.45 | 8.17 | 8.17 | 8.17 | 8.17 |
| Urethane Oligomer diluted in Isobornyl Acrylate (25%) | CN966J75 | 23.5 | — | — | — | — | — |
| Urethane Oligomer diluted in (20%) TRPGDA and EOEOEA (8%) | Ebecryl 8800-20R | 22.3 | — | — | — | — | — |
| Urethane Oligomer | Ebecryl 8804 | — | 23.5 | — | — | — | — |
| Urethane Oligomer diluted in HDODA (12%) | Ebecryl 284 | — | 22.3 | — | — | — | — |
| Urethane Oligomer diluted in EOEOEA | BR-582E | — | — | 20.4 | — | 20.4 | — |
| Urethane Oligomer | BR-5824 | — | — | — | 20.4 | — | — |
| Urethane Oligomer | BR-5825 | — | — | — | — | — | 20.4 |
| Hexafunctional Urethane Oligomer | Ebecryl 8301 | 6.15 | 6.15 | 6.46 | 6.46 | 6.46 | 6.46 |
| Propoxylated Glycerol Triacrylate | OTA-480 | 22.2 | 22.2 | — | — | — | — |
| Propoxylated NPGDA | SR 9003 | — | — | 20.4 | — | — | 20.4 |
| Propoxylated Glyceryl Triacrylate | SR 9021 | — | — | — | 20.4 | — | — |
| Ethoxylated TMPTA | SR 454 | — | — | — | — | 20.4 | — |
| Carboxyethyl Acrylate | β-CEA | 4.58 | 4.58 | 3.50 | 3.50 | 3.50 | 3.50 |
| Isobornyl Acrylate | SR 506 | — | — | 6.46 | 6.46 | 6.46 | 6.46 |
| Surface Additive | Byk-333 | 0.62 | 0.62 | 0.50 | 0.50 | 0.50 | 0.50 |
| Optical Brightener | Uvitex OB | 0.07 | 0.07 | 0.07 | 0.07 | 0.07 | 0.07 |
| 2-Butanone | 2-Butanone | 16.1 | 16.1 | 6.80 | 6.80 | 6.80 | 6.80 |
| N-Butyl Acetate | N-Butyl Acetate | — | — | 27.2 | 27.2 | 27.2 | 27.2 |
| | Viscosity | 64.8 | | 22.7 | 23.1 | 24.0 | 23.8 |
| | Color (APHA) | | | 60–70 | 60–70 | 60–70 | 50–60 |

TRPGDA = tripropyleneglycol diacrylate
EOEOA = ethoxy ethoxy ethyl acrylate
HDODA = 1,6-hexanediol diacrylate
NPGDA = neopentyl glycol diacrylate
TMPTA = trimethylolpropane triacrylate Test Procedures Impact testing was conducted by firing the coated golf ball from a compressed air cannon, as known to one skilled in the art, at approximately 100 mph into a steel chamber. After impact, the ball was allowed to come to rest after bouncing 8–10 times and removed from the box. This test measures the toughness, adhesion, and scratch resistance of the coating as well as its ability to protect the logo stamp.

checked as described above after 100 and 500 hours. The Uw exposure was provided by UVA-340 lamps.

The viscosities of the formulations listed in Table I were measured using a #2 Zahn cup in accordance with ASTM Method D 4212-93. The viscosities shown in Table IV were measured using a Brookfield Viscometer, Model LV, with the #3 spindle at 30 rpm. The viscosities were measured at several temperatures between 20° C. and 65° C.

TABLE II

Coating Color and Impact Resistance

| Formulation | A | B | C | D | E | F | F1 | F2 |
|---|---|---|---|---|---|---|---|---|
| Amount | 95.63 | 95.63 | 98.00 | 98.00 | 98.00 | 98.00 | 98.00 | 98.00 |
| TPO[1] | 1.58 | 1.58 | — | — | — | — | — | — |
| Methyl Phenyl-glyoxylate | 2.39 | 2.39 | 2.00 | 2.00 | 2.00 | 2.00 | 2.00 | — |
| MMMP[2] | 0.40 | 0.40 | — | — | — | — | — | — |
| HMPP Blend[3] | — | — | — | — | — | — | — | 2.00 |
| UV Lamp[4] | D | D | H | H | H | H | Exc | Exc |
| Delta b*,[5] | 1.48 | 2.92 | −0.67 | −0.37 | −0.56 | −0.29 | 0.12 | 3.19 |
| Impact Resistance | 20 | 10 | >75 | >75 | >75 | >75 | >75 | >75 |

[1] 2,4,6-Trimethylbenzoyldiphenylphosphine oxide
[2] 2-Methyl-1-[(4-methylthio)phenyl]-2-morpholinopropan-1-one
[3] 30% 2-Hydroxy, 2-methyl-1-phenylpropan-1-one and 70% Oligo[2-hydroxy-2-methyl-1-[4-(1-methylvinyl)phenyl]propanone]
[4] UV lamp used to cure. H and D are electrodeless lamps from Fusion UV Systems, Inc., while Exc is a Fusion Excimer lamp. H is the standard Hg vapor bulb, while D is doped with a metal salt. The line speed was 20–25 feet/min.
[5] Delta b* is change relative to industry standard

TABLE III

Changes in b* Due to QUV Testing

| Formulation | Initial | 100 Hours | 500 Hours |
|---|---|---|---|
| Standard | −6.26 | −1.64 | 1.15 |
| C | −6.93 | 1.20 | 5.61 |
| D | −6.63 | −1.31 | 1.07 |
| E | −6.82 | 1.04 | 3.25 |
| F | −6.55 | −0.35 | 2.42 |
| F1 | −6.14 | 1.00 | 3.02 |
| F2 | −3.07 | 0.16 | 1.23 |

TABLE IV

Viscosity of Formulation D at 100% Solids as a Function of Temperature

| Temp (° C.) | Viscosity (cps) |
|---|---|
| 22 | 3280 |
| 26 | 2068 |
| 30 | 1700 |
| 38 | 1036 |
| 44 | 648 |
| 51 | 488 |
| 57 | 356 |
| 65 | 240 |

What is claimed is:

1. A coating composition for producing high impact tolerant surfaces, said coating composition comprising 0 to about 70 percent by weight solvent and about 30% to 100% by weight of ethylenically unsaturated resin solids, said resin solids comprising about 10% to about 40% by weight of monoethylenically unsaturated monomers, about 60% to about 90% by weight polyethylenically unsaturated resins comprising a polyolefin functional aliphatic urethane (meth)acrylate having a functional equivalent molecular weight of about 500 to about 2500, a hexaolefin functional oligomer having a functional equivalent molecular weight of about 100 to about 250, and an alkoxylated polyol di- or tri(meth)acrylate monomer, and an initiator in an amount effective to polymerize the resin composition.

2. The composition of claim 1 further comprising an optical brightener.

3. The composition of claim 2 wherein the optical brightener is present in an amount less than 0.3% by weight of resin solids.

4. The composition of claim 1 wherein the weight ratio of the alkoxylated polyol di- or tri(meth)acrylate to the polyethylenically unsaturated aliphatic urethane (meth)acrylate is about 2:1 to about 1:2.

5. The composition of claim 1 wherein the weight ratio of the alkoxylated polyol di- or tri(meth)acrylate to the hexafunctional oligomer is about 2:1 to about 7:1.

6. The composition of claim 1 wherein the polyethylenically functional aliphatic urethane is 2- to 3-functional.

7. The composition of claim 6 wherein the ratio of 2-3 functional resin solids to hexafunctional resin solids is about 2:1 to about 12:1.

8. The composition of claim 1 wherein the monoethylenically unsaturated monomers are selected from (meth)acrylated monomers.

9. The composition of claim 1 wherein the initiator is a free radical initiator.

10. The composition of claim 9 wherein the initiator is capable of being activated by incident actinic radiation.

11. The composition of claim 9 wherein the initiator is capable of being activated by thermal activation.

12. The composition of claim 1 wherein the solvent comprises $C_3$–$C_6$ ketone and a $C_1$–$C_6$ alkyl acetate, propionate or butyrate.

13. The composition of claim 1 wherein the composition is solvent free.

14. The composition of claim 10 wherein the free radical initiator is activated by UV radiation.

15. The composition of claim 1 further comprising $\leq 1.0$ percent by weight of a flow agent.

16. The composition of claim 4 further comprising an optical brightener.

17. The composition of claim 1 further comprising a pigment.

18. The composition of claim 2 further comprising a pigment.

19. A golf ball coated with the composition of claim 1.

20. A golf ball coated with the composition of claim 2.

21. A golf ball coated with the composition of claim 15.

22. A golf ball coated with the composition of claim 16.

23. A radiation curable coating composition comprising a solvent solution containing greater than 40% by weight of ethylenically unsaturated resin solids, said resin solids comprising at least two monofunctional ethylenically unsaturated monomers, and at least two polyethylenically unsaturated urethane resins, one of which having a functional equivalent molecular weight of about 500 to about 2500 and the other having a functional equivalent molecular weight of about 100 to about 250, said polyethylenically unsaturated resins present in a weight ratio of about 2:1 to about 7:1 respectively, an effective amount of an optical brightener, and a free radical initiator in an amount effective to polymerize the resin composition.

24. The composition of claim 23 wherein at least one of the monofunctional ethylenically unsaturated monomers in the composition includes a carboxylic acid functionality.

25. The composition of claim 23 further comprising a alkoxylated polyol di-or tri(meth)acrylate forming about 20 to about 40% b said coating composition.

26. The composition of claim 23 further including a flow agent.

27. The composition of claim 23 wherein the optical brightener is added in an amount up to about 0.3% by weight of the resin solids.

28. A method of coating an article of manufacture to provide a surface coating having high impact tolerance, said method comprising the steps of coating the article with a coating composition of claim 1.

29. A method of coating an article of manufacture to provide a surface coating having high impact tolerance, said method comprising the steps of coating the article with a coating composition of claim 23.

30. The method of claim 28 wherein the article of manufacture is a golf ball.

* * * * *